May 27, 1952   P. KUCERA   2,598,564
PRESS DRIVE FOR VITREOUS MATERIALS
Filed April 5, 1946   6 Sheets-Sheet 1

INVENTOR
Peter Kucera
By Green, McCallister and Miller
His attorneys

May 27, 1952 P. KUCERA 2,598,564
PRESS DRIVE FOR VITREOUS MATERIALS
Filed April 5, 1946 6 Sheets-Sheet 5

INVENTOR
Peter Kucera
By Green, McCallister, and Miller
HIS ATTORNEYS

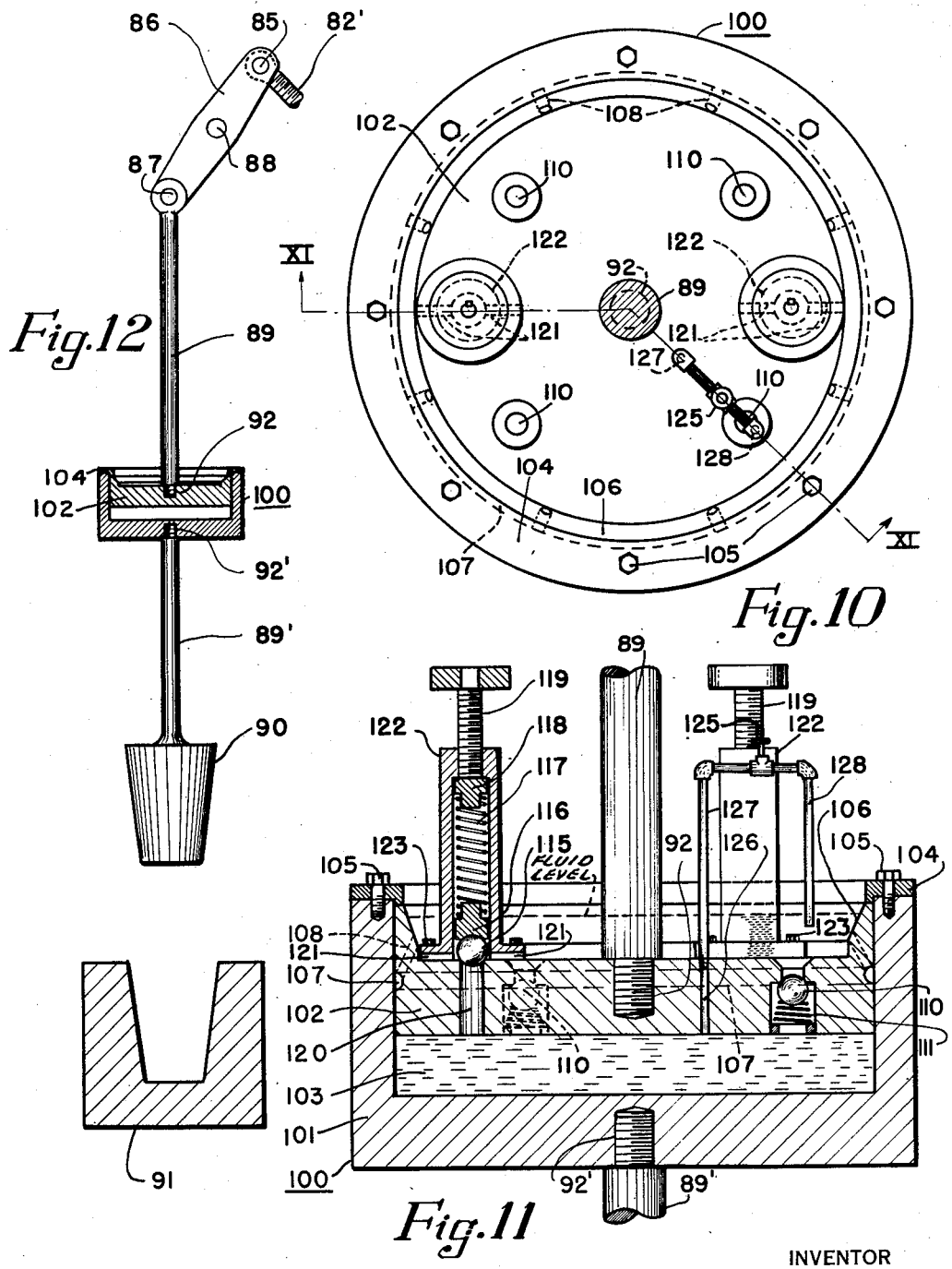

Patented May 27, 1952

2,598,564

UNITED STATES PATENT OFFICE 2,598,564

PRESS DRIVE FOR VITREOUS MATERIALS

Peter Kucera, Allison Park, Pa.

Application April 5, 1946, Serial No. 659,993

15 Claims. (Cl. 74—25)

This invention pertains to mechanical apparatus for translating rotary motion into a timed reciprocal motion requiring intermediate periods of dwell, and more particularly, to actuating apparatus suitable for operating a presser for shaping suitable materials such as plastic or vitreous materials.

Previous to my invention there have been various arrangements for pressing glass articles. The majority of them have been automatic or semi-automatic employing compressed air or some other suitable fluid as the motivating agency. A large fluid displacement cylinder has been required to move the presser or plunger into and out of the mold due to the length of the stroke needed to clear the plunger from the mold and also due to the high pressure required to force vitreous or thermo-plastic material into the mold cavities to properly form the shape. It is known that for more than 90% of the stroke of the plunger, a minimum amount of power is required which corresponds to the weight of the actuating parts. The maximum power is required at the end of the stroke at which time the viscosity of the glass increases along with the resistance area. The numerous devices in use employing compressed air, hydraulic cylinders, etc., have been limited to the extent that the quality of glass does not correspond to that obtained by the skilled glass presser who has complete manual control over all the steps including pressure applications and their duration.

And, an object of my invention has been to provide improved apparatus for making shapes.

Another object of my invention has been to devise new and improved presser operating apparatus that will provide manipulations of greater precision than heretofore possible and with a minimum consumption of power.

Another object has been to provide improved movement and pressure translating apparatus.

Another object has been to provide new and improved motion translating apparatus for a presser which can be accurately and minutely timed and operated to approach if not exceed the accuracy and quality of manufacture heretofore limited to manual work done by highly skilled glass workers.

A further object has been to provide timing apparatus which can be more accurately controlled by the operator.

A still further object has been to provide apparatus capable of producing improved glass or plastic articles.

These and many other objects of my invention will appear to those skill in the art from the drawings, specifications and the claims.

In the drawings,

Figure 2A is a sectional detail taken along the line IIA—IIA of Figure 2;

Figure 2B is a sectional view taken along the line IIB—IIB of Figure 1;

Figure 6 shows the maximum "up" position while Figure 7 shows the maximum "down" position.

Figure 8 shows a relationship of the parts when the presser is in its maximum "down" position and Figure 9 shows a relationship when the presser or plunger is in its maximum raised position.

Figure 10 is a top plan view illustrating a dashpot that may be employed.

Figure 11 is a side sectional view in elevation taken along the line XI—XI of Figure 10.

Figure 12 is a side view in elevation and partial section of a somewhat diagrammatic nature showing a presser, a mold, and a dashpot interposed between actuating mechanism and a rod and presser.

Broadly speaking, in carrying out the principles of my invention, I provide a suitable fluid or electric motor which may be of a rotatory or reciprocal type, but is preferably of the former type. Suitable speed reducing means is driven by the motor and may be connected through a suitable clutch mechanism to timing and motion translating apparatus. The latter apparatus is a differential gear mechanism provided with pinion gear means for adjusting the timing therebetween. The differential gear mechanism is in turn provided with or is operably connected through cranks or oppositely rotating wheels to actuate a mechanical system in such a manner as to produce a timed oscillatory movement. The mechanical system is connected through a lever or toggle mechanism to provide an "up" and "down" movement to a presser. The presser may be employed directly to form shapes in a suitable mold or may, and is preferably, provided with a fluid dashpot device for giving a better control of pressure application. The apparatus is adapted to be timed manually or automatically at a given instant and means are provided for changing the automatic timed relationship as desired. In this way the apparatus can be quickly adapted to changed characteristics of the material to be die or mold formed and to adjust the pressing steps in accordance with the exact pressures required at a given period, and thus, in accordance with the temperature or viscosity of the material being pressed at such period.

More specifically, in the embodiment of my invention chosen for the purpose of illustration, I have provided apparatus that may be operated substantially automatically if desired. That is, the driving clutch will ordinarily be automatically disconnected by a trip mechanism after the presser has been raised to its upper position and a complete pressing cycle has been completed. I employ a pinion gear adjustment for changing the operating relationship between parts of the mechanical mechanism to vary the periods involved. At any time during the operation I can manually take over the timing and readjust it to changed conditions as desired.

Figure 1:
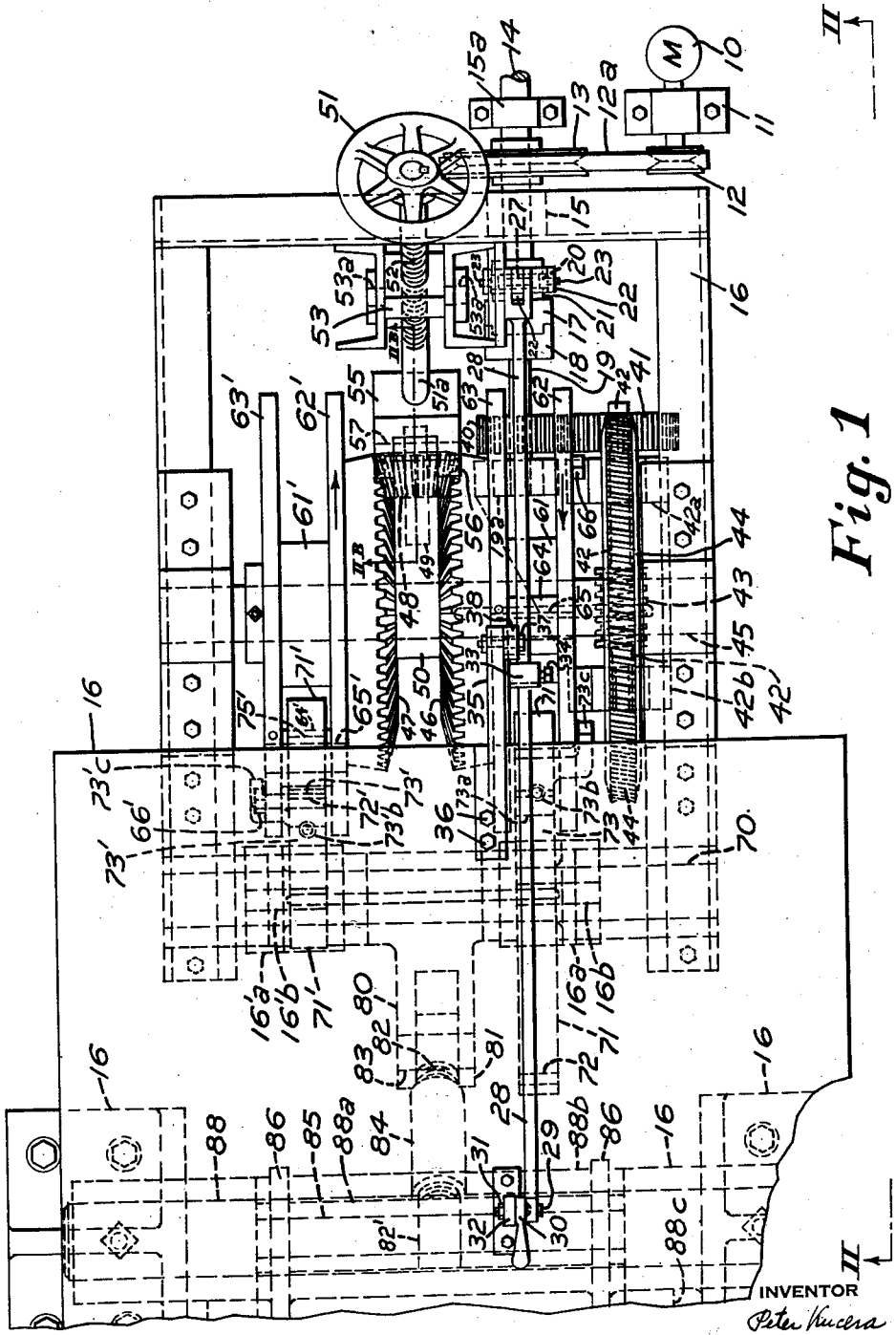
Figure 1 is a top plan view of apparatus illustrating my invention.
Figure 2:
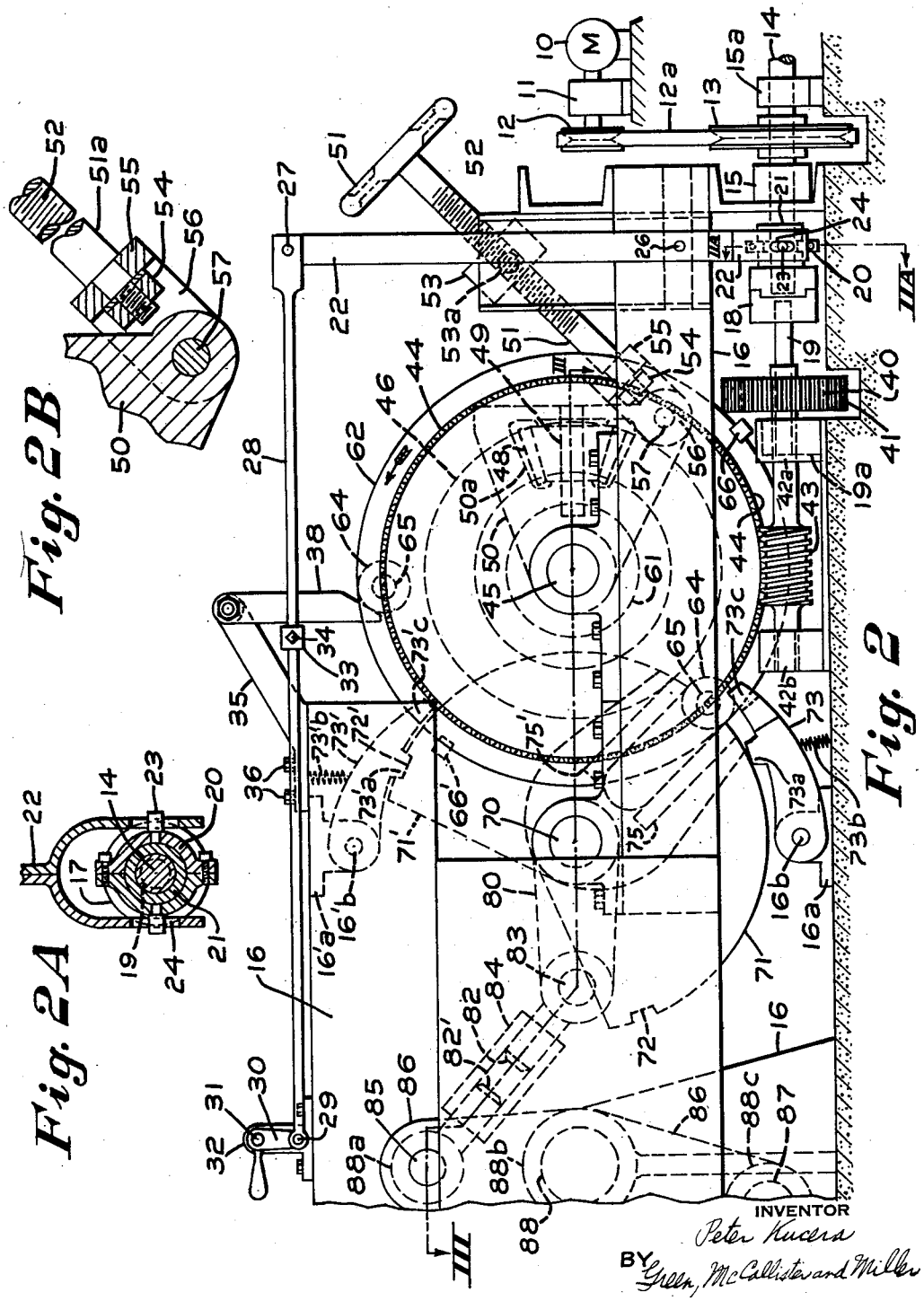
Figure 2 is a side view in elevation of the apparatus of Figure 1.

Referring particularly to Figures 1 and 2 of the drawings, I have shown a motor 10 and a speed reducing unit 11 driving a pulley 12 which may be a belt 12a connected to a pulley 13 keyed to a drive shaft 14 which is journaled at 15 on a table or frame 16 and at 15a on a pillow block outside the frame, see Figure 2. The primary drive shaft 14 is at one end provided with a clutch half 17 of any standard design, see Figures 1 and 2, slidably, axially keyed or feathered thereon that is adapted to engage and disengage a clutch half 18 keyed to a secondary shaft 19 also journaled on the frame 16. As shown in Figure 2, the secondary shaft 19 is journaled within a pillow block 19a which extends from the frame 16. A clutch operating sleeve 20 has an inner portion 21, see Figure 2A, secured to clutch half 17 to move it into and out of engagement with the clutch half 18. A clutch disengaging mechanism comprising a lever arm 22 is at one end suitably bifurcated to fit over the sleeve 20 and is mounted thereon by a pin and slot connection 23—24. The inner portion 21 of the outer sleeve 20 is rotatably mounted therein and carries or positions the outer sleeve. The operating lever arm 22 is pivotally mounted on the frame 16 at 26 and is actuated by a secondary arm 28 through pivot connection 27. The arm 28 is moved lengthwise either by a hand lever 30 or automatically by a trip-mount 38. The lever 30 is pivotally mounted at 31 on a support bracket 32 that extends from the frame 16 and is pivotally connected to secondary arm 28 at 29. The sleeve cam 33 is adjustably secured to arm 28 by a set bolt 34. A trip mechanism having a mounting arm 35 is secured at 36 to frame 16. A trip arm 38 is pivotally mounted on arm 35 at 37 and extends downwardly to engage a trip roller 64 of the mechanical operating mechanism. Thus, movement of the manual control arm or lever 30 or of the trip 38 will cause the vertical lever 22 to pivot about 26 and move the two sleeves 20 and 21 and the associated clutch half 17 axially along the primary drive shaft 14.

Figure 3:
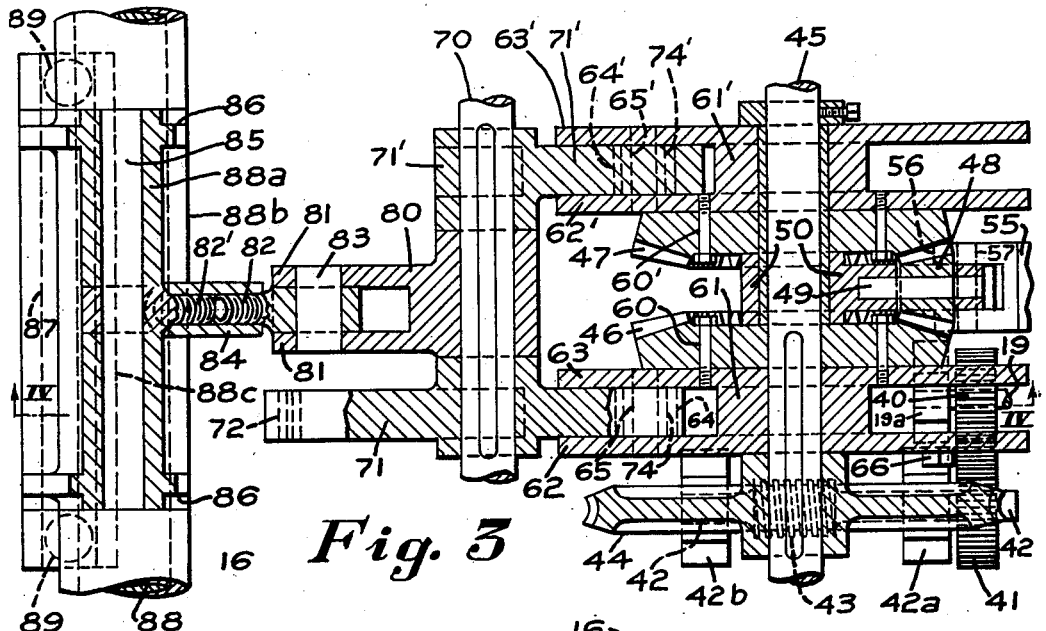
Figure 3 is a horizontal section taken along the line III—III of Figure 2 and showing details of a timing mechanism.

Referring also to Figures 2 and 3, a pinion gear 40 is shown keyed on one end of secondary shaft 19 and meshes with a gear wheel 41 that is keyed to a tertiary shaft 42 that has a worm gear 43 adjacent one end thereof. The tertiary shaft 42 is journaled within a spaced pair of pillow blocks 42a and 42b, see particularly Figures 1 and 2. The worm gear 43 meshes with worm wheel 44 that is keyed to differential shaft 45, see Figure 3.

A differential beveled gear 46 is keyed to and a beveled gear 47 is rotatably journaled on (see particularly Figures 1 and 3) the differential shaft 45 and mesh with a common, beveled pinion or timing gear 48. The timing gear 48 is rotatably mounted on a pinion shaft 49 within a slotted portion of a rack 50 that is rotatably journaled on the differential shaft 45, see Figures 1, 2, 3 and 4.

As shown particularly in Figures 1 and 2, a timing adjustment wheel 51 having a shaft 51a is threaded at 52 to cooperate with a threaded housing 53 that is pivotally mounted by a trunnion pin 53a within extending portions of the frame 16. At its extending end, the shaft 52 is rotatably bolted at 54 to a flange 55. The flange 55 is a part of a connecting bifurcated arm 56 that is pivotally connected by a pin 57 to the timing-gear-supporting rack or plate 50. It will be noted that the timing gear 48 is mounted within a slot 50a in the plate 50. It will be seen that adjustment of the wheel 51 will cause the rack 50 to move about the differential shaft 45 and adjust the relative position of the timing gear 48 with respect to the differential gears 46 and 47, see Figure 3. Thus, when one of the differential gears is held stationary, the timed relationship of the operation of one gear may be adjusted with respect to the other gear.

As shown in Figure 3, the differential gear 46 is bolted at 60 to a U-shaped rotating actuating wheel 61. Wheel 61 is keyed on the differential shaft 45 and has a pair of spaced apart and extending disc flanges 62 and 63 provided with a roller 64 rotatably secured therebetween on a pin shaft 65. The disc portion 62 has a detent releasing lug 66 extending outwardly from adjacent an outer edge portion thereof for engaging and releasing a detent mechanism 73, see Figure 4, which will be hereinafter described.

The other differential gear 47 may be similarly secured by bolts 60′ to a U-shaped disc wheel 61′ that is rotatably journaled on the differential shaft 45 and is provided with a pair of spaced apart disc-like arms 62′ and 63′. A detent releasing lug 66′ extends from adjacent an outer edge portion of the disc 63′ for engaging and releasing a second detent 73′, see Figures 3, 4, 8 and 9. An operating roller 64′ is mounted in a similar manner to the roller 64 of the first-mentioned rotary wheel 61. To simplify the understanding and description I have used prime suffixes on similar parts in connection with rotating members 61 and 61′.

As shown, a mechanical shaft 70 is journaled within the frame 16 in a spaced apart relationship with respect to planetary shaft 45 and has a pair of spaced apart mechanical discs or wheels 71 and 71′ keyed thereon for rotation therewith.

Since the construction of each of these wheels is similar I will describe one in detail and indicate similar parts on the other by prime suffixes. However, it will be noted that the position of the similar parts is different on the two discs 71 and 71'.

Figure 4:
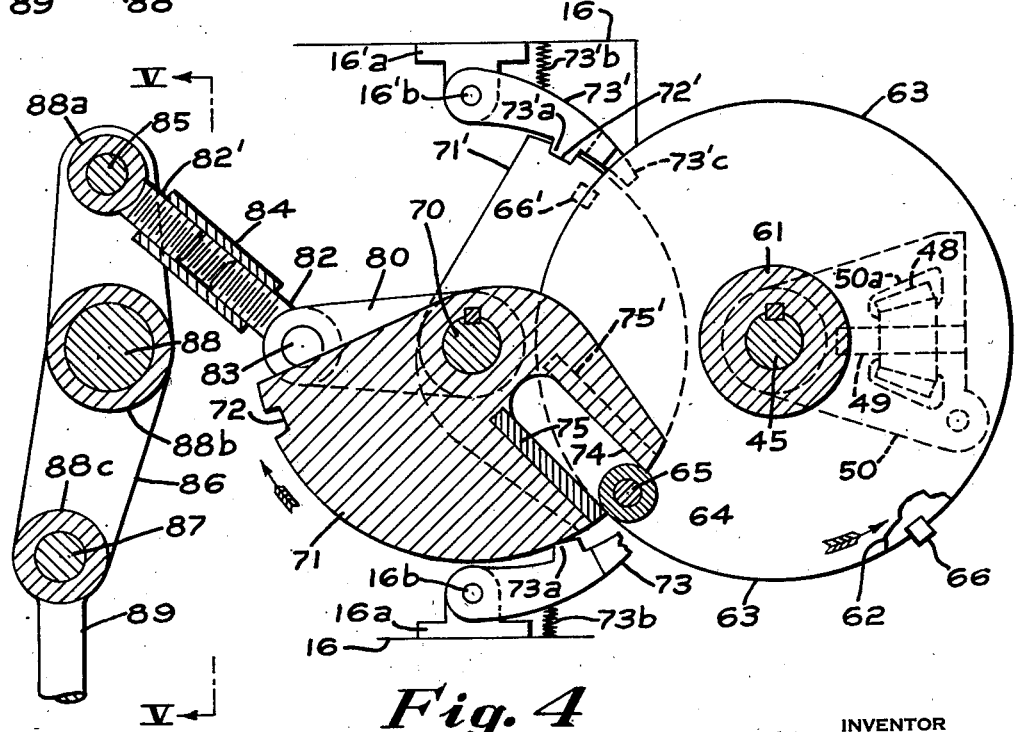
Figure 4 is a side section view in elevation taken along the lines IV—IV of Figure 3.
Figure 6:
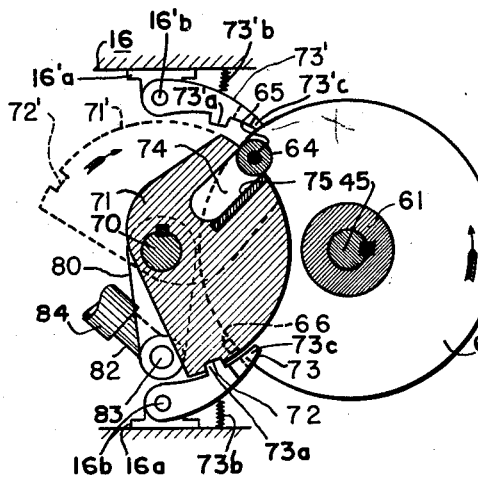
Figures 6 and 7 are somewhat diagrammatical views showing a part of a mechanical mechanism of Figure 5 in two positions, corresponding to the maximum "up" position and the maximum "down" position of the presser.
Figure 7:
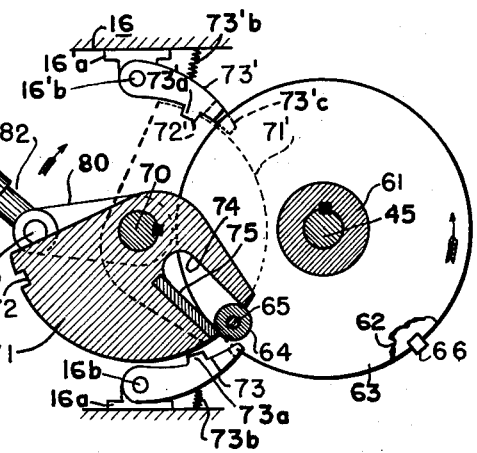

The disc 71, see Figures 4, 6, and 7, is provided with a slot 72 in the edge thereof which is adapted to be engaged by a spring pressed detent 73 pivotally mounted on the frame 16. The disc 71 has a radially extending slot 74 that on one side has a roller-engaged-outwardly-projecting face 75 which receives the corresponding roller 64 of the corresponding and cooperating drive wheel 61 to move the presser 90, which will be later described, from an "up" position to a "down" position. In a similar manner, see Figures 8 and 9, the second mechanical disc 71' engages the roller 64' of the cooperating driving wheel 61' at suitable intervals to move plunger or presser 90 from a down pressing position to a raised or inoperative position.

As shown particularly in Figure 4, the detent 73 is pivotally mounted at one end by a pivot pin 16b on a mount bracket 16a. The mount bracket 16a is securely mounted on the frame 16. A spring 73b mounted between the frame 16 and the detent 73 normally urges the detent away from the frame and toward an engaging relationship with respect to a slot 72 in the disc 71. As previously indicated, corresponding parts of the other detent 73' are of similar construction and mounting. Referring particularly to Figure 8A, it will be seen that each detent, such as the detent 73', is provided with a latch projection 73'c that is adapted to be engaged by the lug 66'.

Figure 5:
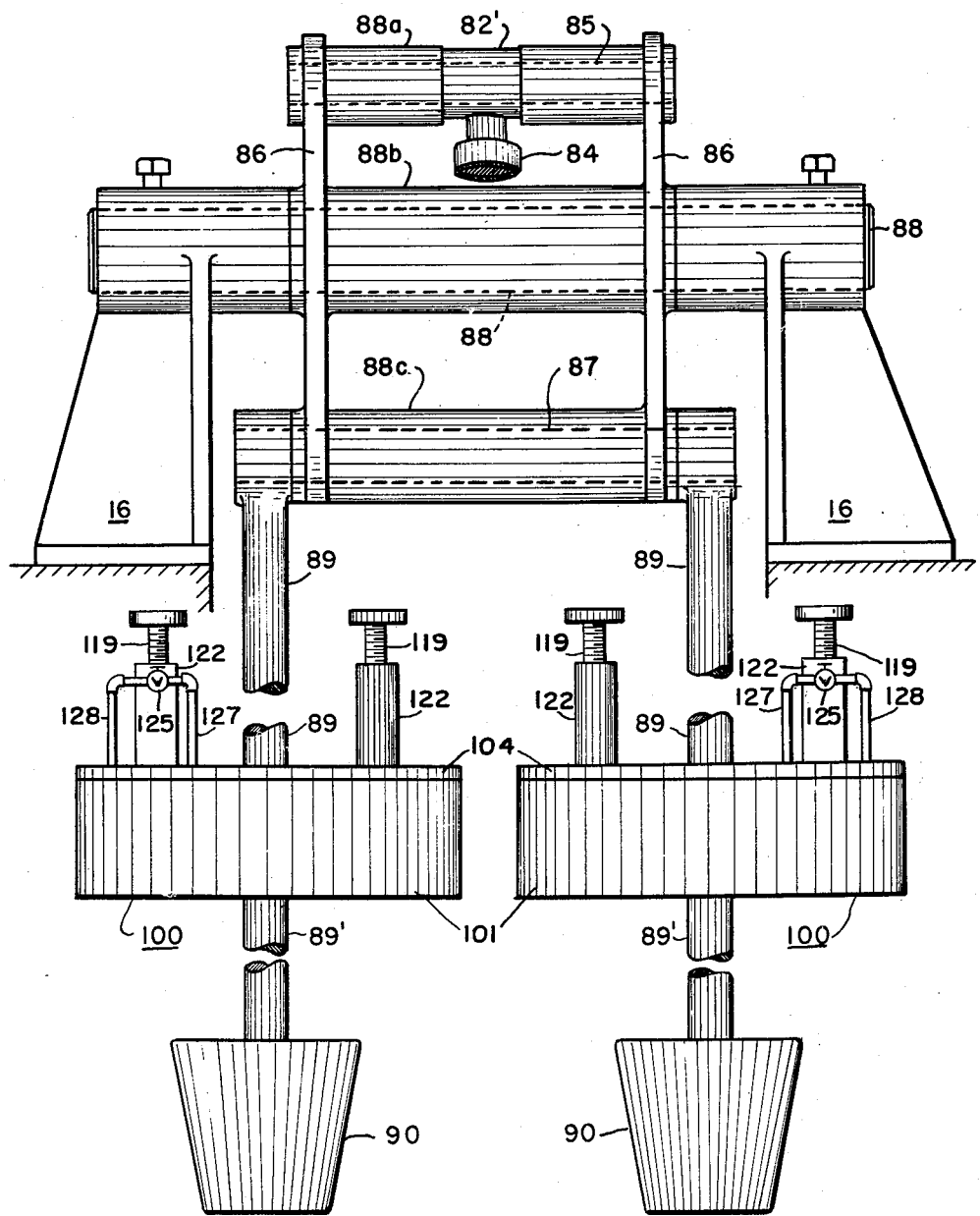
Figure 5 is a lateral end view taken along the line V—V of Figure 4 and showing a detail of toggle or crank and lever mechanism of Figures 3 and 4.

A presser actuating or operating hub or crank 80 is keyed on the mechanical shaft 70 between the discs 71 and 71' and is adapted to turn back and forth therewith. As shown particularly in Figure 3, the presser lever actuating hub or crank 80 is provided with a pair of spaced apart bifurcated portions 81 for receiving a presser operating arm 82. The arm 82 is drilled at one end to receive a pin 83, see Figure 4, which extends through the bifurcated portions 81, see Figure 3, and pivotally connects the hub 80 to the arm 82. The arm has a second part 82' whose relative position is adjusted by a threaded sleeve 84. The latter engages correspondingly threaded portions of the operating arms 82 and 82'. The operating arm 82' is pivoted at one end to a toggle mechanism by shaft 85, see Figures 4 and 5. The shaft 85 is journaled in a transverse sleeve portion 88a that is secured between a pair of lever arms 86. The toggle mechanism, see Figure 5, includes a shaft 88 mounted on the frame 16 and a pair of vertical lever arms 86 pivoted on the shaft 88 by a transverse sleeve portion 88b and forming an operating frame or lever system. A pair of presser actuating rods 89 are pivoted to the frame by a shaft 87 to which they are secured. The shaft 87 is journaled within a transverse sleeve portion 88c that is secured between the lever arms 86. As shown in Figure 5, one or more pressers may be actuated as desired.

My invention may also be utilized to improve the operation of a pneumatic or hydraulic system, e. g., a rod 89 may be connected to a piston of a fluid cylinder to transmit movement effected by the mechanical system through a fluid system to presser or press and blow devices of a glass making machine. Thus, a machine or a battery of machines may, if desired, be actuated by mechanism of my invention located at a remote point in the factory.

Figures 10 and 11 illustrate a dashpot 100 constructed in accordance with my invention. The dashpot 100 has a reservoir casing or housing 101 which may be of circular shape, a plunger or piston 102 operatively positioned to move up and down inner walls of the casing 101 and forming a fluid chamber 103. The maximum upward movement of the plunger 102 is limited by a stop rim or ring 104 mounted on edge portions of the casing 101 by suitable bolts 105 and by an upwardly extending rim 106 on the plunger. Oil or some other suitable fluid is employed to fill the casing 101 and to extend above the plunger 102 to maintain a level as shown by the dotted lines. A circular piston groove 107 extends around the periphery of the plunger 102 and is connected to the upper oil level by passageways 108. This, in effect, provides a fluid seal for the plunger in its movement.

The lower portion of the operating rod or shaft 89, see Figures 11 and 12, is provided with a screw-threaded extension portion 92, which is mounted on the plunger 102. In the same manner the lower part 89' of the operating shaft is threadably secured by extension 92' to the bottom of the casing 101. Each ball check valve 110 is held normally closed against fluid pressure in the upper or reservoir portion of the container 101 by spring 111. That is, the operation of the spring 111 is supplemented by pressure of the fluid within chamber 103.

Each ball type adjustable safety or ball valve 115 comprises a ball guide 116, a positioning spring 117, a spring guide 118, and an adjustable screw 119 is operably positioned within a housing 122. The housing 122 may be removably mounted on the plunger 102 by bolts 123. A passageway 120 extends from the chamber 103 and permits fluid to flow into the upper chamber or reservoir past the ball valve 115 through slots or passageways 121.

I have shown a bleeder valve 125 mounted by a pipe 127 on the plunger or piston 102 and connected with a passageway 126 that extends through the plunger into the chamber 103. The upper face of the plunger 102 and extending side walls of the casing 101 provides a fluid reservoir into which an extending end of pipe connection 128 is submerged to prevent air from being sucked into the cylinder cavity 103.

The period of the dwell of the presser 90 in its lower position within mold 91 is divided into two parts. First, a maximum pressure period to cause the glass to fill all mold cavities and second, a cooling period sufficient for the glass to retain its shape before the presser is withdrawn. It is thus important to reduce the pressure to a minimum in the second period. This is accomplished by suitably manually adjusting the bleeder valve 125. However, any suitable automatic timing valve may be used if desired. As long as the valve 125 is completely closed a maximum pressure will be exerted by the presser 90. For example, if the desired period of dwell of the presser 90 is four seconds, the bleeder valve 125 may be set to open slightly in one second, due to the time lag before fluid flow is initiated and before it become effective; the time differential will depend on a number of factors such as the viscosity of the fluid, operative lag of the dashpot, etc.

The maximum pressure exerted is determined by the adjustment of safety or ball valve 115.

When the adjusted pressure of the spring 117 of the safety valve 115 is overcome by the pressure of fluid in the chamber 103, fluid escapes into the upper chamber or reservoir through the passageways or slots 120 and 121. During the upward movement of the piston 102, oil is returned to inner chamber or cylinder 103 past the check valve 110. The suction or vacuum created in chamber 103 by the upward movement of the plunger 102 causes the balls of valves 110 to unseat, thus allowing the upper level of fluid to enter the chamber 103 through valves 110. The sealing groove 107 hermetically seals the piston 102 during its operation to prevent air from entering the lower chamber 103. Thus, all the movements, dwells, and the intensity of pressure are positive and adjustable within determined limits.

Referring particularly to Figures 3, 4 and 6 to 9, inclusive, it will be seen that the differential gears 46 and 47 are driven in opposite directions and that the associated plate driving wheel 61 of gear 46 is utilized to drive the mechanical mechanism clockwise or in one direction; the associated driving wheel 61' is utilized to drive the mechanical mechanism in a counterclockwise or opposite direction. This has been illustrated in Figures 6 to 9, inclusive. As shown in Figures 6 and 7, the set of operating elements associated and driven by the differential gear 46 are employed to move the mechanical disc 71 from the position shown in Figure 6 to the position shown in Figure 7 which in turn moves the toggle mechanism in such a manner as to move the presser 90 from its maximum "down" position to its maximum "up" position. The detent releasing lug 66 of the disc 61 engages the detent 73 to move it out of the holding or locking slot 72 of mechanical disc 71 just as the roller 64 of disc 61 fully enters the slot 74. This is shown particularly in Figure 6. As the roller 64 of the actuating wheel 61 moves out of the slot 74, the detent slot 72' of the other mechanical disc 71' is engaged by a second detent 73' to hold or lock the mechanical mechanism stationary during the next period of operation, see Figure 7. A mechanical mechanism in the sense here shown is a mechanism providing intermittent rotary movement as generated by a cam.

Figure 8:
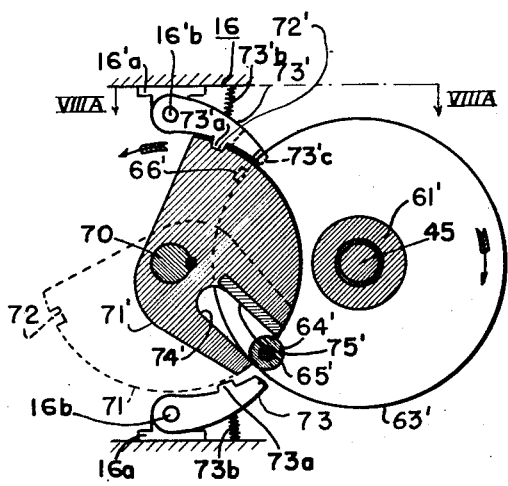
Figures 8 and 9 show corresponding positions for the second half of the mechanical mechanism. That is.
Figure 9:
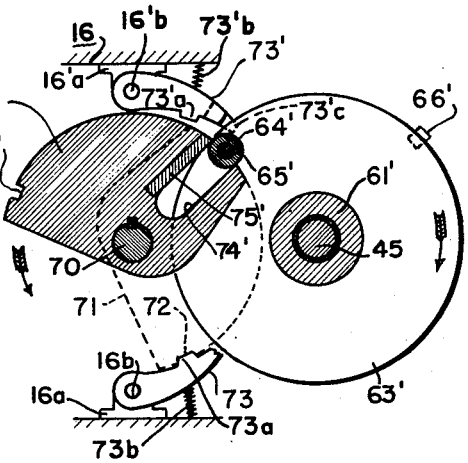
Figure 8A:
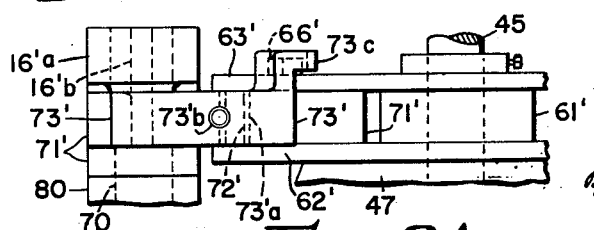
Figure 8A is a detail plan view taken along the line VIIIA—VIIIA of Figure 6.

Figure 8 shows what may be a corresponding relative position of the roller 64', slot 74', and release lug 66' of the element when the first-mentioned parts are in the position shown in Figure 7. In other words, the detent releasing lug 66' of the actuating wheel 61' is about to release the detent 73' just before the roller 64' enters the slot 74' in the mechanical disc 71'. After the roller 64' has entered the slot 74' it moves the mechanical disc in the direction of the arrows to the position of Figure 9. That is, the toggle or crank and lever mechanism is actuated to move the presser 90 from its maximum "down" position to its maximum "up" position. At the end of this movement the other detent 73 engages the detent slot 72 in the mechanical disc 71 and the roller disc 64' of the actuating wheel 61' moves out of the slot 74' of disc 71'.

As previously pointed out, by adjusting hand wheel 51 when one of the mechanical discs is engaged by a detent, I can adjust the relative timing between the differential gears 46 and 47 and thus, the relative operating positions of each set of actuating wheel and mechanical disc elements that are operated thereby. This, of course, will vary the period of dwell at the "upper" and "down" positions of the presser 90 and will determine when the mechanical discs are again moved from one position to another.

Although I have shown an automatic trip arrangement for disengaging the clutch half 17 just before the roller 64 is ready to enter the mechanical disc slot 74 to move the presser 90 to a "down" position, I also contemplate a similar trip mechanism connected to arm 22 below its pivot 26 to enable roller 64 to release the clutch when the presser 90 is in its maximum "down" position; the additional trip arm corresponding to 38 and its cam 33 will, however, be in a reverse position to that shown in Figure 2; in such event, the roller 64 engages the trip mechanism while it is in the down position of Figure 7.

The speed of the stroke of the presser 90 is controlled by the primary shaft 14. The time of the presser 90 in its "down" position is timed by the relative position of the crank or actuating wheel 61' with respect to the wheel 61 as adjusted by the pinion 48 and its screw shaft 51a as well as by the "lag" of the dashpot 100. The time of the presser 90 in its upper position is controlled by the relative position of the roller 64 with respect to the trip element 38, as well as by the wishes of the operator as governed by the hand lever 30. The operator can manually disengage and engage the clutch half 17 at any step of the operation as desired.

By the differential arrangement provided by hand wheel 51, the position of roller 64 can be advanced or delayed as desired; the setting can be changed from zero to 50% of the time of a complete cycle. The clutch control thus provides unlimited timing arrangements.

Although I have developed my invention for the manufacture of glassware, it may also have application to metal or plastic die casting operations. It is especially applicable to the forming of vitreous and thermo-plastic materials.

That is, the mechanism shown has a wide field of application and adjustments and adaptations may be effected without departing from its spirit and scope as indicated by the appended claims.

What I claim is:

1. Apparatus for operating a presser for shaping plastic or vitreous material comprising, an actuating means, a mechanism having automatically-controlled periodically engaging parts operably connected to said actuating means, and means operably connecting said mechanism to the presser for periodically actuating it, said last-mentioned means having a timing mechanism to control the duration of dwell of the presser and having a pressure release mechanism sensitive to resistance offered by the material upon the presser to control the intensity of pressure exerted by the presser on the material.

2. Apparatus for operating a presser or similar device to shape a suitable material which comprises, an actuating means, a pair of mechanisms operably mounted with respect to each other, each of said mechanisms having a pair of parts, one of said mechanisms being operably connected to said actuating means, one part of said one mechanism being operably positioned to periodically engage one part of the other of said mechanisms and move said other mechanism in one direction, the other part of said one mechanism being operably positioned to periodically engage the other part of said other mechanism and move said other mechanism in an opposite direction, and a crank and lever mechanism operably connecting said other mechanism to the device to periodically actuate it in opposite directions.

3. Apparatus as defined in claim 2 wherein, means is operably connected between the pair of parts of said one mechanism to change the periodicity of engagement with the pair of parts of said other mechanism.

4. Apparatus for operating a presser or similar device to shape a suitable material comprising, a frame, a drive shaft journaled on said frame, turnable means operably mounted on said frame, rotating mechanism operably connected to said shaft for actuation thereby, said mechanism having a pair of oppositely rotating parts, and means operatively associated with each of said pair of rotating parts and constructed and arranged to periodically engage said turnable means and move it successively in opposite directions, said turnable means being operably connected to the presser.

5. Apparatus for operating a presser or similar device to shape a suitable material comprising, a frame, a drive shaft journaled on said frame, turnable means operably mounted on said frame, rotating mechanism operably mounted on said frame and connected to said shaft for actuation thereby, said mechanism having a pair of oppositely rotating parts, timing means operably connected to one of said pair of rotating parts and constructed and arranged to change its operating relationship with respect to the other of said rotating parts, and means operatively associated with each of said pair of rotating parts and constructed and arranged to periodically engage said turnable means and move it successively in opposite directions, said operatively associated means being operably connected to the presser.

6. Apparatus for operating a presser or similar device to shape a suitable material comprising, a pair of crank wheels, means operably connected to said wheels to turn one wheel in an opposite direction to the other wheel, mechanism periodically operably connected to each of said wheels for actuation thereby in opposite directions, and lever arms operably connecting the presser to said mechanism to periodically move the presser in opposite substantially lengthwise directions.

7. Apparatus for operating a presser or similar device to shape a suitable material comprising, a pair of differential gears, means for driving one of said gears, gear means meshing with said driven gear and with the other differential gear for driving the other gear in an opposite direction with respect to the driven gear, and means for adjusting the relationship of said meshing gear with respect to said differential gears to change the operative timing therebetween, a rotary wheel mechanism operably associated with each of said differential gears for actuation thereby, said rotary wheel mechanism having a periodically actuated crank arm, and movement translating connections between the presser and said crank arm to translate turning movement of said rotary wheel mechanism into lengthwise reciprocating movement as applied to the presser.

8. Apparatus for operating a presser or similar device to shape a suitable material comprising, a pair of rotatable gears, means operably connected to said gears for driving one gear in one direction and the other gear in an opposite direction, a pair of discs, means operably connecting said discs together, means operably connected to one of said gears and constructed and arranged to periodically engage one of said discs to turn it in one direction, means operably connected to the other of said gears and constructed and arranged to periodically engage the other of said discs to turn it in an opposite direction, toggle means connected to said discs, and means operably connecting the presser to said toggles for actuating the presser.

9. Apparatus for operating a presser or similar device to shape a suitable material comprising, a pair of gears, an intermediate gear meshing between said pairs of gears and operably connected to rotate said pair of gears in opposite directions through said intermediate gear, a pair of turnably mounted elements, a pair of rotatable members mounted on and actuated by said pair of gears, means on one of said rotatable members constructed and arranged to periodically engage the other of said elements to move said element in an opposite direction, and means operably connecting said pair of elements to the presser for actuating it in opposite directions in accordance with the periodic movement of said elements.

10. Apparatus for operating a presser or similar device to shape a suitable material comprising, a frame, primary and secondary drive shafts journaled on said frame, a clutch having a pair of engaging parts operably connecting said primary driving shaft to said secondary shaft, turnable means operably mounted on said frame, means periodically operably connecting said secondary drive shaft to said turnable means to actuate said means, and means operably connecting the presser to said turnable means for actuating it in accordance with movement of said means.

11. Apparatus for operating a presser or similar device to shape a suitable material comprising, a primary driving means, a secondary driving means, a clutch having a pair of engaging parts operably connecting said primary driving means to secondary driving means, turnable means, means periodically operably connecting said secondary means to said turnable means to actuate it, control means operably connected to said clutch and constructed and arranged to move said clutch parts into and out of engagement, means operably associated with said turnable means and periodically engaging said control means to disengage said clutch parts at desired intervals, and means operably connecting the presser to said pair of elements for actuating the presser.

12. Apparatus for operating a presser or similar device to shape a suitable material comprising, primary and secondary driving means, a clutch having one part constructed and arranged to engage a second part, one part being connected to said primary means, the other part being connected to said secondary means, control means operably connected to the clutch part of said primary means and constructed and arranged to move said clutch part into and out of engagement with the other clutch part, a pair of turnable elements, means periodically operably connecting said secondary means to each of said turnable elements in succession, timing means operably associated with said periodic connecting means and constructed and arranged to change its periodicity, and means operably associated with said periodic connecting means and constructed and arranged to periodically engage said control means to disconnect said clutch parts at desired intervals, and operable connections between said turnable elements and the presser for actuating it.

13. Apparatus for operating a presser or similar device through a fluid-pressure-sensitive means to shape a suitable material comprising, a primary driving means, a secondary driving means, a clutch having a pair of engaging parts operably connecting said primary driving means to said secondary driving means, a pair of turnable elements, means periodically operably connecting said secondary means to said turnable elements in succession to actuate them, control means operably connected to said clutch and constructed and arranged to move said clutch parts into and out of engagement, means operably associated with said pair of elements and periodically engaging said control means to disengage said clutch parts at desired intervals, and means operably connecting the fluid-pressure-sensitive means to said pair of elements for actuating the presser.

14. In a machine having a mold presser for manufacturing glassware from a suitable thermoplastic or viscous material, a frame, a primary drive shaft journaled on said frame, a secondary drive shaft journaled on the frame, a clutch having a pair of engaging parts, one of said parts being slidably mounted on said primary shaft, the other of said parts being securely mounted on said secondary shaft, a lever mechanism pivotally mounted on said frame and connected at one end to said slidably mounted clutch part for moving it into and out of engagement with said second clutch part, a pair of spaced apart differential gears journaled on said frame, a worm gear journaled on said frame and secured to one of said differential gears for rotation therewith, tertiary drive connections between said secondary shaft and said worm gear for actuating it, a pinion rack pivoted on said frame, a pinion gear journaled on said rack and positioned in the spacing between said differential gears and meshing with and operably connecting said driven differential gear to the other differential gear of said pair to rotate the other gear in an opposite direction to said driven gear, an adjusting shaft-screw connected to said frame and pivotally connected to said pinion rack and constructed and arranged to move said pinion with respect to said pair of differential gears to change the operative timing between said pair of gears, a pair of crank wheels, one of said wheels being secured to one of said differential gears and the other wheel being secured to the other differential gear for rotation therewith, a pair of spaced apart and operably connected discs turnably mounted on said frame, each of said discs having a radial slot extending from an edge portion thereof, a roller mounted on each of said crank wheels, the said roller of one of said wheels being constructed and arranged to periodically enter the slot of one of said discs during such period, the said roller on the other of said wheels being constructed and arranged to periodically enter the slot of the other disc in an opposite direction therewith, a pair of spring detents, a slot in one of said discs adapted to receive one of said detents after the completion of one of the above-mentioned disc movements, a slot in the other of said discs adapted to receive the other of said detents after the completion of the other of the above-mentioned disc movements, the said roller on one of said crank wheels being constructed and arranged to engage and release one of said detents during the rotation of said crank wheel, the said roller on the other of said crank wheels being constructed and arranged to engage and release the other of said detents during its reverse rotation to permit said discs to periodically turn in opposite directions with said crank wheels, a trip mechanism mounted on said frame and operably connected to said clutch lever mechanism for moving it to a clutch disengaging position, one of said rollers being adapted to engage said trip mechanism and actuate it during the rotation of said crank wheel on which said roller is mounted, toggle levers operably connected to said disc pair and constructed and arranged to translate the opposite turning movements of said discs into a longitudinal reciprocating movement, and means operably connecting said toggle levers to the mold-presser.

15. Apparatus for operating a presser or similar device through a fluid dashpot to shape a suitable material comprising, a periodically operated differential and movement translating mechanism, lever arms connected to said differential and movement translating mechanism for actuation thereby, and means operably connecting said lever arms to the fluid dashpot.

PETER KUCERA.

REFERENCES CITED

The following references are of record in the file of this patent:

UNITED STATES PATENTS

| Number | Name | Date |
|---|---|---|
| 543,154 | Kuhlewind | July 23, 1895 |
| 561,056 | Kuhlewind | May 26, 1896 |
| 1,263,496 | Wenderhold | Apr. 23, 1918 |
| 1,404,406 | Prouty | Jan. 24, 1922 |
| 1,637,161 | Richard | July 26, 1927 |
| 1,671,065 | Clisson | May 22, 1928 |
| 2,061,170 | Post | Nov. 17, 1936 |
| 2,266,838 | Winn | Dec. 23, 1941 |
| 2,282,652 | Henning | May 12, 1942 |

OTHER REFERENCES

American Machinist Gear Book, Third Edition 1922, pages 253–267.